United States Patent
Shete

(10) Patent No.: US 12,471,148 B2
(45) Date of Patent: Nov. 11, 2025

(54) RANDOM ACCESS CONTROL IN COMMUNICATION SYSTEM

(71) Applicant: RAKUTEN MOBILE, INC., Tokyo (JP)

(72) Inventor: Pankaj Shete, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 18/001,873

(22) PCT Filed: Jan. 6, 2022

(86) PCT No.: PCT/JP2022/000258
§ 371 (c)(1),
(2) Date: Dec. 15, 2022

(87) PCT Pub. No.: WO2023/074007
PCT Pub. Date: May 4, 2023

(65) Prior Publication Data
US 2024/0137987 A1    Apr. 25, 2024
US 2024/0237075 A9    Jul. 11, 2024

(30) Foreign Application Priority Data

Oct. 29, 2021   (JP) ................... 2021-177197

(51) Int. Cl.
*H04W 74/0833*   (2024.01)
*H04W 74/00*   (2009.01)

(52) U.S. Cl.
CPC ..... *H04W 74/0833* (2013.01); *H04W 74/002* (2013.01)

(58) Field of Classification Search
CPC . H04W 74/0833; H04W 74/002; H04W 4/70; H04W 72/12; H04W 74/006;
(Continued)

(56) References Cited

U.S. PATENT DOCUMENTS

2003/0153320 A1    8/2003   Noerpel et al.
2010/0080135 A1*   4/2010   Ishii ............... H04B 7/2637
                                                            370/252
(Continued)

FOREIGN PATENT DOCUMENTS

| JP | 2013172414 A | 9/2013 |
|---|---|---|
| JP | 2016526836 A | 9/2016 |
| WO | 2021062666 A1 | 4/2021 |

OTHER PUBLICATIONS

"PRACH Congestion mitigation in NTN IoT", 3GPP TSG RAN WG2 meeting #116e Electronic Meeting, Nov. 1 to 12, 2021, 4pp.

*Primary Examiner* — Nizam U Ahmed
(74) *Attorney, Agent, or Firm* — HAUPTMAN HAM, LLP

(57) ABSTRACT

A communication control apparatus has: a random access channel identification unit that identifies a plurality of random access channels over which a communication device can transmit random access information to a base station, a communication device grouping unit that groups each communication device into a plurality of random access groups that are associated with different portions of the plurality of random access channels, and a random access information transmission restriction unit that restricts the transmission of random access information, for a communication device grouped into each random access group, over the random access channels not associated with each random access group.

8 Claims, 10 Drawing Sheets

(58) Field of Classification Search
CPC ..... H04W 84/06; H04W 74/08; H04W 48/10; Y02D 30/70
See application file for complete search history.

(56) References Cited

U.S. PATENT DOCUMENTS

2011/0244907 A1\* 10/2011 Golaup ................... H04W 4/08
                                                                455/509
2012/0113938 A1   5/2012 Larsson et al.
2024/0292450 A1\* 8/2024 Wu ..................... H04W 74/002

\* cited by examiner

FIG.3

| UE | IMSI |
|---|---|
| UE1 | 1013016041741 |
| UE2 | 1013016041742 |
| UE3 | 1013016041743 |
| UE4 | 1013016041744 |
| UE5 | 1013016041745 |

| SFN |
|---|
| 768 |
| 769 |
| 770 |

FIG.4

| UE | IMSI | SFN | Divider "n" | (IMSI) mod n | (SFN) mod n | (IMSI) mod n = (SFN) mod n ? |
|---|---|---|---|---|---|---|
| UE1 | 10130160041741 | 768 | 3 | 2 | 0 | FALSE |
| UE1 | 10130160041741 | 769 | 3 | 2 | 1 | FALSE |
| UE1 | 10130160041741 | 770 | 3 | 2 | 2 | TRUE |
| UE2 | 10130160041742 | 768 | 3 | 0 | 0 | TRUE |
| UE2 | 10130160041742 | 769 | 3 | 0 | 1 | FALSE |
| UE2 | 10130160041742 | 770 | 3 | 0 | 2 | FALSE |
| UE3 | 10130160041743 | 768 | 3 | 1 | 0 | FALSE |
| UE3 | 10130160041743 | 769 | 3 | 1 | 1 | TRUE |
| UE3 | 10130160041743 | 770 | 3 | 1 | 2 | FALSE |
| UE4 | 10130160041744 | 768 | 3 | 2 | 0 | FALSE |
| UE4 | 10130160041744 | 769 | 3 | 2 | 1 | FALSE |
| UE4 | 10130160041744 | 770 | 3 | 2 | 2 | TRUE |
| UE5 | 10130160041745 | 768 | 3 | 0 | 0 | TRUE |
| UE5 | 10130160041745 | 769 | 3 | 0 | 1 | FALSE |
| UE5 | 10130160041745 | 770 | 3 | 0 | 2 | FALSE |

FIG. 9

| | Coverage (km²) | RACH per second per UE | Supported UE density |
|---|---|---|---|
| GEO | 650,000 (hex with r=500km) | 1.157*10⁻⁵ (1 time per day per UE) | 596 UE/km² |
| | 650,000 | 2.78*10⁻⁴ (1 time per hour per UE) | 25 UE/km² |
| | 650,000 | 0.0017 (1 time per 10 min per UE) | 4 UE/km² |
| | 162,500 (hex with r=250km) | 1.157*10⁻⁵ (1 time per day per UE) | 2383 UE/km² |
| | 162,500 | 2.78*10⁻⁴ (1 time per hour per UE) | 99 UE/km² |
| | 162,500 | 0.0017 (1 time per 10 min per UE) | 16 UE/km² |
| LEO | 26,000 (hex with r=100km) | 1.157*10⁻⁵ (1 time per day per UE) | 14893 UE/km² |
| | 26,000 | 2.78*10⁻⁴ (1 time per hour per UE) | 620 UE/km² |
| | 26,000 | 0.0017 (1 time per 10 min per UE) | 101 UE/km² |
| | 6,500 (hex with r=50km) | 1.157*10⁻⁵ (1 time per day per UE) | 59571 UE/km² |
| | 6,500 | 2.78*10⁻⁴ (1 time per hour per UE) | 2479 UE/km² |
| | 6,500 | 0.0017 (1 time per 10 min per UE) | 405 UE/km² |

FIG.10

| | Coverage (km²) | RACH per second per UE | Supported UE density |
|---|---|---|---|
| GEO | 650,000 (hex with r=500km) | $1.157*10^{-5}$ (1 time per day per UE) | 60 UE/km² |
| | 650,000 | $2.78*10^{-4}$ (1 time per hour per UE) | 2 UE/km² |
| | 650,000 | 0.0017 (1 time per 10 min per UE) | 0 UE/km² |
| | 162,500 (hex with r=250km) | $1.157*10^{-5}$ (1 time per day per UE) | 477 UE/km² |
| | 162,500 | $2.78*10^{-4}$ (1 time per hour per UE) | 20 UE/km² |
| | 162,500 | 0.0017 (1 time per 10 min per UE) | 3 UE/km² |
| | 26,000 (hex with r=100km) | $1.157*10^{-5}$ (1 time per day per UE) | 7446 UE/km² |
| | 26,000 | $2.78*10^{-4}$ (1 time per hour per UE) | 310 UE/km² |
| | 26,000 | 0.0017 (1 time per 10 min per UE) | 51 UE/km² |
| LEO | 6,500 (hex with r=50km) | $1.157*10^{-5}$ (1 time per day per UE) | 59571 UE/km² |
| | 6,500 | $2.78*10^{-4}$ (1 time per hour per UE) | 2479 UE/km² |
| | 6,500 | 0.0017 (1 time per 10 min per UE) | 405 UE/km² |

RANDOM ACCESS CONTROL IN COMMUNICATION SYSTEM

RELATED APPLICATIONS

The present application is a National Phase of International Application Number PCT/JP2022/000258 filed Jan. 6, 2022, which claims the benefit of priority from Japanese Patent Application No. 2021-177197, filed on Oct. 29, 2021.

BACKGROUND OF THE INVENTION

1. Field of the Invention

The present disclosure relates to random access control in communication system.

2. Description of the Related Art

The number, types, and applications of wireless communication devices, represented by smartphones and Internet of Things (IoT) devices, continue to increase, and wireless communication standards continue to be expanded and improved. For example, the commercial service of the fifth generation mobile communication system known as "5G" started in 2018, and the standards are still being developed by the 3GPP (Third Generation Partnership Project). Efforts are also underway to develop standards for "6G" or the sixth generation mobile communication system, which would be the next generation of wireless communication standards following 5G.

A Random Access (RA) procedure is defined for a mobile or portable communication device such as a smart phone or cellular phone (hereinafter collectively referred to as a communication device) after power-on and the like to initiate communication with a mobile communication network. In the RA procedure disclosed in Patent Literature 1, a given time-frequency resource (hereinafter referred to briefly as resource) in a 10 ms uplink frame used for uplink communication from a communication device to a base station is reserved as a physical random access channel (PRACH). A communication device attempting random access to a base station selects any one preamble from up to 64 predefined random access preambles (hereinafter briefly referred to as preambles) that the base station can accept and sends it to the base station over the PRACH. When the base station receives the preamble from the communication device through the PRACH, if no other communication device has sent the same preamble to the base station over the same PRACH, it sends a random access response (hereinafter briefly referred to as response) to the communication device and proceeds to the subsequent connection establishment step and the like.

Patent Literature 1: JP-T-2012-533211

SUMMARY OF THE INVENTION

On the other hand, when multiple communication devices send the same preamble to the base station over the same PRACH, either none of them proceed to the connection establishment step and the like, or only one of them proceeds to the connection establishment step and the like. A communication device that could not proceed to the connection establishment step and the like by not receiving a normal response from the base station, has to wait until the next PRACH according to the PRACH configuration index set in the network.

In 5G, which advocates Massive Machine-Type Communications (mMTC), the number of communication devices, including IoT devices, connected to a single base station at the same time is increasing, resulting in potential "congestion" (hereinafter referred to as PRACH congestion) by communication devices waiting for the RA procedure or PRACH described above. Furthermore, in addition to or instead of general base stations installed on the ground (hereinafter referred to as terrestrial base stations), non-terrestrial base stations such as communication satellites and/or unmanned aircrafts flying in the outer space and/or the atmosphere such as stratosphere are being considered and/or introduced. As described below, the PRACH congestion may become more serious for non-terrestrial base stations than for terrestrial base stations.

The present disclosure was made in view of the circumstances, and the purpose is to provide a communication control apparatus and the like that can improve the efficiency of random access control.

In order to solve the above issue, a communication control apparatus in a certain aspect of the present disclosure includes: a random access channel identification unit that identifies a plurality of random access channels over which a communication device can transmit random access information to a base station, a communication device grouping unit that groups each communication device into a plurality of random access groups that are associated with different portions of the plurality of random access channels, and a random access information transmission restriction unit that restricts the transmission of random access information, for a communication device grouped into each random access group, over the random access channels not associated with each random access group.

According to the aspect, for a communication device grouped into each random access group, the transmission of random access information to a base station over the random access channels not corresponding to each random access group is restricted. In other words, since the number of communication devices transmitting random access information over each random access channel is limited, the likelihood of collision of random access information of multiple communication devices on the same random access channel is reduced. Therefore, the random access procedure of each communication device can be made more efficient.

Another aspect of the present disclosure is a communication control method. The communication control method includes: identifying a plurality of random access channels over which a communication device can transmit random access information to a base station, grouping each communication device into a plurality of random access groups that are associated with different portions of the plurality of random access channels, and restricting the transmission of random access information, for a communication device grouped into each random access group, over the random access channels not associated with each random access group.

Further another aspect of the present disclosure is a computer-readable medium. The computer-readable medium stores a communication control program causing a computer to perform: identifying a plurality of random access channels over which a communication device can transmit random access information to a base station, grouping each communication device into a plurality of random access groups that are associated with different portions of the plurality of random access channels, and restricting the nication device grouped into each random access group, over the random access channels not associated with each random access group.

In addition, any combination of the above components, and any conversion of the expression of the present disclosure among methods, devices, systems, recording media, computer programs, and the like, is also valid as a form of the present disclosure.

According to the present disclosure, the efficiency of random access control of a communication device can be improved.

BRIEF DESCRIPTION OF THE DRAWINGS

FIG. 3 shows a concrete example. FIG. 4 shows a concrete example. FIG. 9 shows the estimation results of PRACH congestion in NTN where the present embodiment is not applied. FIG. 10 shows the estimation results of PRACH congestion in NTN where the present embodiment is not applied.

DETAILED DESCRIPTION OF THE INVENTION

The communication control apparatus according to the present disclosure can be applied to; a terrestrial network (TN) constructed by communication cells provided on the ground by terrestrial base stations installed on the ground (hereinafter referred to as terrestrial communication cells); a non-terrestrial network (NTN) constructed by communication cells provided on the ground by flying non-terrestrial base stations (hereinafter referred to as non-terrestrial communication cells); and other mobile communication networks such as a network where TN and NTN coexist. In order to provide a comprehensive description of TN and NTN, the present embodiment shows a network in which TN and NTN coexist as an example.

Figure 1:
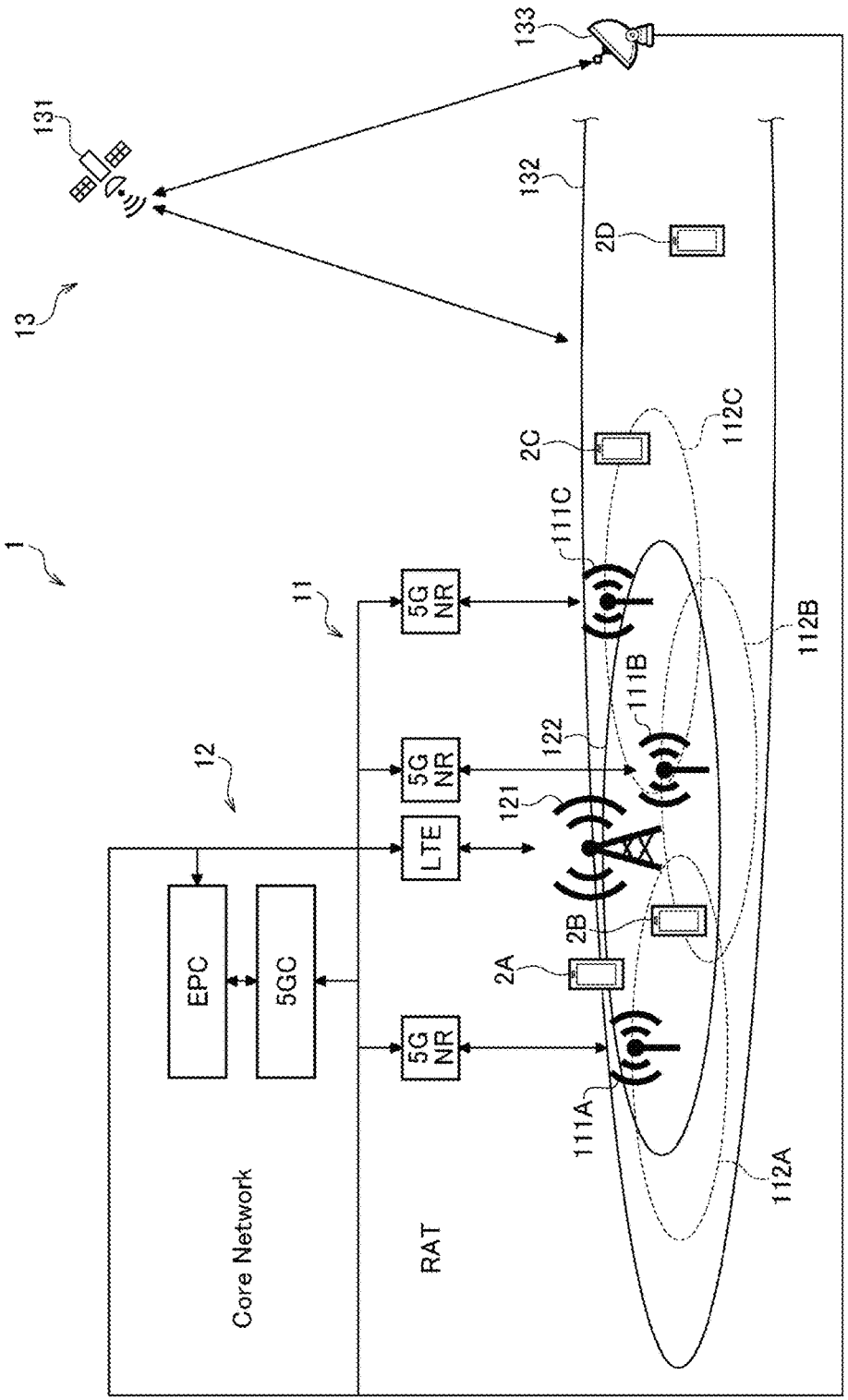
FIG. 1 schematically shows the overview of a wireless communication system to which the communication control apparatus is applied.

FIG. 1 schematically shows an overview of a wireless communication system 1 to which the communication control apparatus according to the present embodiment is applied. The wireless communication system 1 includes 5G wireless communication system 11, 4G wireless communication system 12, and satellite communication system 13. 5G wireless communication system 11 that complies with the fifth generation mobile communication system (5G) uses NR (New Radio) or 5G NR (Fifth Generation New Radio) as the radio access technology (RAT) and 5GC (Fifth Generation Core) as the core network. 4G wireless communication system 12 that complies with the fourth generation mobile communication system (4G) uses LTE (Long Term Evolution) or LTE-Advanced as the radio access technology and EPC (Evolved Packet Core) as the core network. Satellite communication system 13 is for satellite communication via communication satellite 131. Although not shown in the figure, the wireless communication system 1 may include wireless communication networks of a generation prior to 4G, a generation later than 5G (e.g. 6G), or any wireless communication networks that are not associated with generations, such as Wi-Fi (registered trademark).

The 5G wireless communication system 11 may include a plurality of 5G base stations 111A, 111B and 111C (hereinafter collectively referred to as 5G base station 111) installed on the ground capable of communicating by 5G NR with communication devices or communication devices 2A, 2B, 2C and 2D (hereinafter collectively referred to as communication device(s) 2) such as smartphones, which are also referred to as UE (User Equipment). 5G base station 111 is also referred to as gNodeB (gNB). The coverage or support range of each 5G base station 111A, 111B and 111C is referred to as a cell 112A, 112B and 112C (hereinafter collectively referred to as 5G cell 112).

The size of the 5G cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For the reason, 5G tends to use more small cells than 4G and earlier generations.

The communication device 2 can conduct 5G communication when it is located within at least one of a plurality of 5G cells 112A, 112B and 112C. In the example shown in the figure, communication device 2B in 5G cells 112A and 112B can communicate with both 5G base stations 111A and 111B by 5G NR. In addition, the communication device 2C in the 5G cell 112C can communicate with the 5G base station 111C by 5G NR. Communication devices 2A and 2D are outside of all 5G cells 112A, 112B and 112C, so they are not able to communicate by 5G NR. The 5G NR-based 5G communication between each communication device 2 and each 5G base station 111 is managed by the 5GC, which is the core network. For example, the 5GC transfers data to and from each 5G base station 111, transfers data to and from external networks such as the EPC, the satellite communication system 13 and the Internet, and manages the movement of the communication device 2.

The 4G wireless communication system 12 includes a plurality of 4G base stations 121 (only one of them is shown in FIG. 1) installed on the ground that can communicate with the communication device 2 by LTE or LTE-Advanced. The base station 121 in 4G is referred to as eNodeB (eNB). Similar to each 5G base station 111, the communication range or support range of each 4G base station 121 is also called a cell and is shown as 122.

The communication device 2 can conduct 4G communication when it is located within 4G cell 122. In the example shown in the figure, the communication devices 2A and 2B in the 4G cell 122 can communicate with the 4G base station 121 by LTE or LTE-Advanced. Communication devices 2C and 2D are outside the 4G cell 122 and are not able to communicate by LTE or LTE-Advanced. The 4G communication by LTE and LTE-Advanced between each communication device 2 and each 4G base station 121 is managed by the EPC, which is the core network. For example, the EPC manages the transfer of data to and from each 4G base station 121, the transfer of data to and from external networks such as 5GC, the satellite communication system 13 and the Internet, and the movement management of the communication device 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communication device 2B, one base station is selected as the most suitable for the communication device 2B in terms of communication quality and the like, under the control of the 5GC and/or the EPC, which is the core network. For the communication device 2D that is not in a state that enables 5G communication with any 5G base station 111 or 4G communication with any 4G base station 121, the communication is conducted using the satellite communication system 13 described below.

The satellite communication system 13 is the wireless communication system using communication satellites 131 as non-terrestrial base stations. The communication satellites 131 are low-earth-orbit satellites flying in low-earth-orbit outer space of 500 to 700 km above the ground. Similar to 5G base station 111 and 4G base station 121, the communication range or support range of each communication satellite 131 is also called a cell and is shown as 132. Thus, a communication satellite 131 as a non-terrestrial base station provides a satellite communication cell 132 as a non-terrestrial communication cell onto the ground. Communication device 2 on the ground can conduct satellite communication when it is inside the satellite communication cell 132. Similar to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft and the like with the communication device 2 within the satellite communication cell 132. The radio access technology used by the communication satellite 131 for wireless communication with the communication device 2 in the satellite communication cell 132 may be 5G NR, the same as the 5G base station 111, or LTE or LTE-Advanced, the same as the 4G base station 121, or any other radio access technology that the communication device 2 can use. Therefore, the communication device 2 may not be equipped with any special functions or components for satellite communication.

The satellite communication system 13 is equipped with a gateway 133 as a ground station that is installed on the ground and can communicate with the communication satellite 131. The gateway 133 is equipped with a satellite antenna to communicate with the communication satellite 131, and is connected to the 5G base station 111 and/or the 4G base station 121 as terrestrial base stations that constitute the terrestrial network, via their respective radio access technology (5G NR and/or LTE) or other wired or wireless access technologies or interfaces. In such a manner, the gateway 133 connects the non-terrestrial network (NTN), which includes communication satellites 131, and the terrestrial network TN, which includes terrestrial base stations 111 and 121, for mutual communication. When the communication satellite 131 conducts 5G communication with the communication device 2 in the satellite communication cell 132 by 5G NR, the 5GC connected via the gateway 133 and the 5G base station 111 in the TN (or the 5G radio access network) is used as the core network. When the communication satellite 131 conducts 4G communication with the communication device 2 in the satellite communication cell 132 by LTE or LTE-Advanced, the EPC connected via the gateway 133 and the 4G base station 121 in the TN (or the 4G radio access network) is used as the core network. In such a manner, appropriate coordination is made between different wireless communication systems such as 5G wireless communication system 11, 4G wireless communication system 12, satellite communication system 13 and the like through the gateway 133.

Satellite communication by communication satellites 131 is mainly used for covering areas with no or few terrestrial base stations such as 5G base stations 111 and 4G base stations 121 and the like. In the example shown in the figure, a communication device 2D that is outside the communication cells of all the terrestrial base stations communicates with the communication satellite 131. On the other hand, communication devices 2A, 2B and 2C that are in good communication with either of the terrestrial base stations, are also in the satellite communication cell 132 and can communicate with the communication satellite 131. However, by communicating with the terrestrial base stations instead of the communication satellite 131 as the satellite base station in principle, the limited communication resources (including power) of the communication satellite 131 are saved for the communication device 2D and the like. The communication satellite 131 uses beamforming to direct the communication radio wave to the communication device 2D in the satellite communication cell 132, thereby the communication quality with the communication device 2D is improved.

The size of the satellite communication cell 132 of the communication satellite 131 as a satellite base station depends on the number of beams emitted by the communication satellite 131. For example, a satellite communication cell 132 with a diameter of approximately 24 km can be formed by combining up to 2,800 beams. As illustrated, a satellite communication cell 132 is typically larger than a terrestrial communication cell such as a 5G cell 112 or a 4G cell 122, and could contain one or more 5G cells 112 and/or 4G cells 122 inside it. The above example shows a communication satellite 131 flying in low-earth-orbit outer space at a height of approximately 500 km to 700 km above the ground as a flying non-terrestrial base station. However, a communication satellite flying in geostationary orbit or other higher orbit in outer space, or an unmanned or manned aircraft flying in stratosphere or other lower (e.g. approximately 20 km above the ground) atmosphere may be used as a non-terrestrial base station in addition to or instead of the communication satellite 131.

As described above, the wireless communication system 1 in the present embodiment contains: terrestrial network (TN) 11 and 12 that can communicate with communication devices 2 in the terrestrial communication cells 112 and 122 provided on the ground by the terrestrial base stations 111 and 121 installed on the ground; and non-terrestrial network (NTN) 13 that can communicate with communication devices 2 in the non-terrestrial communication cell 132 provided on the ground by the non-terrestrial base station 131. The communication control apparatus according to the present embodiment controls the TN and the NTN.

Figure 2:
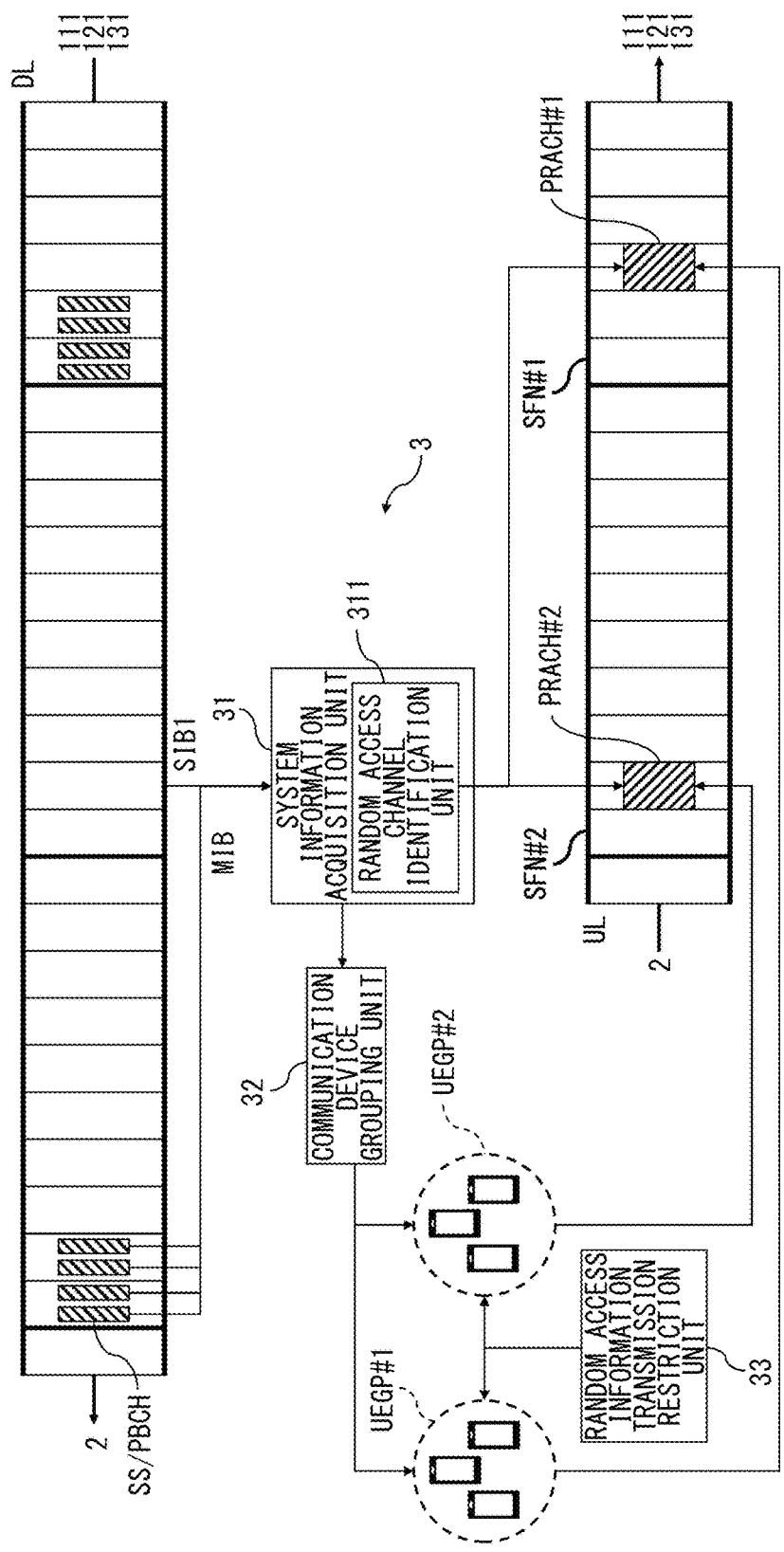
FIG. 2 is a functional block diagram of the communication control apparatus.

FIG. 2 is a functional block diagram of the communication control apparatus 3 according to the present embodiment. The communication control apparatus 3 includes a system information acquisition unit 31, a communication device grouping unit 32, and a random access information transmission restriction unit 33. The functional blocks are realized by the cooperation of hardware resources, such as the central processing unit, memory, input devices, output devices, and peripheral devices connected to the computer, and software that is executed using them. Regardless of the type of computer or the installation location, each of the above functional blocks may be realized with the hardware resources of a single computer, or by combining hardware resources distributed across multiple computers. For example, some or all of functional blocks of the communication control apparatus 3 may be realized in a distributed manner and/or a centralized manner in computer and/or processor provided in the communication devices 2, the terrestrial base stations 111 and 121, non-terrestrial base station 131, and the core network CN. Especially in the present embodiment, most of the functional blocks of the communication control apparatus 3 are realized in the communication devices 2, and the remaining functional blocks are mainly realized in the terrestrial base stations 111, 121, and/or the non-terrestrial base station 131.

The communication device 2 equipped with the system information acquisition unit 31 acquires system information from the downlink frame DL transmitted from base stations 111, 121, 131. FIG. 2 schematically illustrates the concept of the downlink frame DL employed in 5G and the like. In the following, specific configurations and/or numerical values of downlink frame DL and uplink frame UL are illustrated in line with an operational example in 5G, but the present disclosure is also applicable to downlink frame DL and uplink frame UL that adopt different configurations and/or numerical values. In FIG. 2, the horizontal direction of downlink frame DL and uplink frame UL schematically represents the time direction, and the vertical direction of downlink frame DL and uplink frame UL schematically represents the frequency direction. The downlink frame DL can be sequentially transmitted by the base stations 111, 121, 131 on the right side of FIG. 2 to the communication device 2 on the left side of FIG. 2. The uplink frame UL can be sequentially transmitted by the communication device 2 on the left side of FIG. 2 to the base stations 111, 121, 131 on the right side of FIG. 2.

Each downlink frame DL of 10 ms length consists of 10 subframes of 1 ms length each. In 5G, depending on the subcarrier spacing set in the network, a single subframe contains; one slot (when the subcarrier spacing is 15 kHz); two slots (when the subcarrier spacing is 30 kHz); four slots (when the subcarrier spacing is 60 kHz); eight slots (when the subcarrier spacing is 120 kHz); and sixteen slots (when the subcarrier spacing is 240 kHz). Each slot contains 14 OFDM symbols, regardless of the subcarrier spacing. In the following, an example will be described where the subcarrier spacing is 15 kHz, i.e. one slot is included in one subframe. Therefore, in the following description, subframe and slot are synonymous.

In a half-frame (5 ms) of each downlink frame DL consisting of five subframes, multiple SS/PBCH (Synchronization Signal/Physical Broadcast Channel) blocks are transmitted from the base stations 111, 121, 131 to the communication devices 2 in the communication cells 112, 122, 132, using a predetermined time-frequency resource in a predetermined subframe, in a predetermined half-frame cycle (in the example in FIG. 2, 4 half-frame cycles=20 ms cycles). The multiple SS/PBCH blocks transmitted in each half-frame correspond to multiple different beams that can be transmitted by the base stations 111, 121, 131. For example, the four first to fourth SS/PBCH blocks in each half-frame in the example in FIG. 2 are transmitted respectively by the first to fourth beams emitted by the base stations 111, 121, 131.

The SS/PBCH block is for the communication device 2 receiving it to obtain system information necessary to establish frame synchronization and also to establish connection with the base stations 111, 121, 131 by random access as described below. Specifically, the SS/PBCH block contains a primary synchronization signal (PSS: Primary SS) and a secondary synchronization signal (SSS: Secondary SS) as synchronization signals (SS) for frame synchronization. In addition, a master information block (MIB) containing basic system information such as the system frame number (SFN) is transmitted over the physical broadcast channel (PBCH) in the SS/PBCH block.

After establishing frame synchronization by SS and acquiring basic system information from the MIB (operating as the system information acquisition unit 31), the communication device 2 obtains System Information Block Type 1 (SIB1) from the physical downlink shared channel (PDSCH) specified by the MIB. The MIB and SIB1 constitute minimum system information (MSI) in 5G, and contain all the information necessary for establishing connection between the communication device 2 and the base stations 111, 121, 131 by the random access described below. The group number n (n is a natural number greater than or equal to 2) described below, which is used for connection establishment in the present embodiment, is not included in the MSI in the current 5G, but can be additionally stored in SIB1 for example, and can be utilized as a portion of the MSI.

The system information acquisition unit 31 includes a random access channel identification unit 311. The random access channel identification unit 311 identifies a plurality of random access channels over which a communication device 2 can transmit random access information to a base station 111, 121, 131. Specifically, the communication device 2 functioning as the random access channel identification unit 311 refers to the received MSI (especially SIB1), and identifies the time-frequency range of the physical random access channel (PRACH) that is reserved for the transmission of the random access preamble as random access information, in each uplink frame UL that can be transmitted to base stations 111, 121, 131.

Similar to each of the aforementioned downlink frames DL, each uplink frame UL of 10 ms length is composed of 10 subframes of 1 ms length each. Each uplink frame UL is assigned a consecutive (cyclic) system frame number from "0" to "1023" that can be recognized by the communication device 2 through the MIB received by the system information acquisition unit 31. In FIG. 2, the uplink frame "SFN #1" with system frame number "1" and the uplink frame "SFN #2" with system frame number "2" are schematically illustrated.

In 5G, some or all of the frequency resources of one or more slots (each slot being composed of 14 OFDM symbols) in a single uplink frame UL can be reserved as PRACH. In the example in FIG. 2, where the slot length is 1 ms being the same as the subframe length (where the subcarrier spacing is 15 kHz), a portion of the frequency resources of the third slot of the first uplink frame "SFN #1" is reserved as the first physical random access channel "PRACH #1", and a portion of the frequency resources of the second slot of the second uplink frame "SFN #2" is reserved as the second physical random access channel "PRACH #2".

The communication device 2 functioning as the random access channel identification unit 311 refers to the received SIB1 and the like, and identifies the time-frequency range of the physical random access channels "PRACH #1" and "PRACH #2" in sequential uplink frames "SFN #1" and "SFN #2". Note that multiple PRACHs may be reserved in one uplink frame UL. In the following, the communication control apparatus 3 performs random access control for N physical random access channels (RO: RACH Occasion) "PRACH #1", "PRACH #2" ... "PRACH #N" contained in M (e.g. 1024) uplink frames "SFN #1", "SFN #2", ... "SFN #M" with different system frame numbers (typically, M is smaller than or equal to N). If we only look at FIG. 2, M=N=2.

The communication device grouping unit 32 groups each communication device 2 into a plurality of random access groups "UEGP #1" and "UEGP #2" that are associated with different portions of the plurality of physical random access channels "PRACH #1" and "PRACH #2" identified by the random access channel identification unit 311. In the example in FIG. 2, the first random access group "UEGP #1" of the communication devices 2 is mapped to the first physical random access channel "PRACH #1" and the second random access group "UEGP #2" of the communication devices 2 is mapped to the second physical random access channel "PRACH #2". In the following, the number of random access groups of the communication devices 2 is n.

Within FIG. 2, the group number n, the physical random access channel number N, and the uplink frame number M are all 2 (M=N=n=2). It should be noted that the mapping of the n random access groups of the communication devices 2 to the N physical random access channels does not have to be one-to-one as shown in FIG. 2. For example, when n is smaller than N, at least one random access group is mapped to multiple physical random access channels. Similarly, when n is greater than N, at least one physical random access channel is mapped to multiple random access groups.

The communication device grouping unit 32 groups each communication device 2 into n random access groups according to the remainder of communication device identification information of each communication device 2 divided by the group number n included in SIB1 and the like received from base stations 111, 121, 131 by the system information acquisition unit 31. Examples of the communication device identification information of the communication device 2 include user identification number such as IMSI (International Mobile Subscriber Identity) assigned to a user of the communication device 2. Since the remainder of IMSI and the like divided by the group number n (hereafter also written as "IMSI mod n" and the like using the congruence expression) takes n values from 0 to n−1, a large number of communication devices 2 can be efficiently grouped into n random access groups. When the communication device grouping unit 32 is provided in each communication device 2, it groups itself into a random access group according to the remainder of the communication device identification information divided by the group number n.

It should be noted that the identification information specific to the communication device 2, such as the telephone number, IP address, IMSI (International Mobile Equipment Identity) of the communication device 2, may be used as the communication device identification information of the communication device 2. Besides, the same communication device identification information or other information may be used for multiple communication devices 2, since it is sufficient to group a large number of communication devices 2 into n random access groups. For example, a random number or an arbitrary constant assigned in advance to each communication device 2, and/or a random number or an arbitrary constant generated by each communication device 2 itself when it performs the processes of the communication device grouping unit 32, may be divided by the group number n to calculate the remainder.

The random access information transmission restriction unit 33 restricts the transmission of random access preamble, for a communication device 2 grouped into each of the n random access groups, over the physical random access channels not associated with each random access group. In the example shown in FIG. 2, the communication device 2 grouped into the first random access group "UEGP #1" is restricted from transmitting random access preamble over the physical random access channels except for the first physical random access channel "PRACH #1" associated with the first random access group "UEGP #1". In other words, the communication device 2 can transmit random access preamble only over the first physical random access channel "PRACH #1", and cannot transmit random access preamble over the second physical random access channel "PRACH #2".

Similarly, the communication device 2 grouped into the second random access group "UEGP #2" is restricted from transmitting random access preamble over the physical random access channels except for the second physical random access channel "PRACH #2" associated with the second random access group "UEGP #2". In other words, the communication device 2 can transmit random access preamble only over the second physical random access channel "PRACH #2", and cannot transmit random access preamble over the first physical random access channel "PRACH #1". Thus, since the number of communication devices 2 that can transmit random access preamble over each physical random access channel "PRACH #1" and "PRACH #2" is limited, the likelihood of competition or collision of random access preambles of multiple communication devices 2 on the same physical random access channel "PRACH #1" and "PRACH #2" is reduced. Therefore, the random access procedure of each communication device 2 can be made more efficient.

The random access information transmission restriction unit 33 restricts the transmission of random access preamble, for a communication device 2 grouped into each of the n random access groups, over the physical random access channels included in the uplink frame UL in which the remainder of the system frame number included in the MIB and the like received from base stations 111, 121, 131 by the system information acquisition unit 31 divided by the group number n (hereafter also written as "SFN mod n" using the congruence expression) is not equal to the remainder of the IMSI as the communication device identification information of the communication device 2 divided by the group number n (IMSI mod n).

In the example shown in FIG. 2, the communication device 2 grouped into the first random access group "UEGP #1" because it has an IMSI with IMSI mod n=1, is restricted from transmitting random access preamble over the physical random access channels except for the first physical random access channel "PRACH #1" included in the first uplink frame "SFN #1" with system frame number "1" where SFN mod n=1. Thus, the first random access group "UEGP #1" and the first uplink frame "SFN #1" that satisfy IMSI mod n=SFN mod n=1 are associated with each other. Therefore, the communication device 2 belonging to the first random access group "UEGP #1" can transmit random access preamble only over the first physical random access channel "PRACH #1" in the corresponding first uplink frame "SFN #1", and cannot transmit random access preamble over the second physical random access channel "PRACH #2" in the second uplink frame "SFN #2" that does not satisfy IMSI mod n=SFN mod n.

Similarly, the communication device 2 grouped into the second random access group "UEGP #2" because it has an IMSI with IMSI mod n=2, is restricted from transmitting random access preamble over the physical random access channels except for the second physical random access channel "PRACH #2" included in the second uplink frame "SFN #2" with system frame number "2" where SFN mod n=2. Thus, the second random access group "UEGP #2" and the second uplink frame "SFN #2" that satisfy IMSI mod n=SFN mod n=2 are associated with each other. Therefore, the communication device 2 belonging to the second random access group "UEGP #2" can transmit random access preamble only over the second physical random access channel "PRACH #2" in the corresponding second uplink frame "SFN #2", and cannot transmit random access preamble over the first physical random access channel "PRACH #1" in the first uplink frame "SFN #1" that does not satisfy IMSI mod n=SFN mod n.

As described above, the communication device grouping unit 32 and the random access information transmission restriction unit 33 of the communication control apparatus 3, most of whose functions are realized in the communication device 2, simultaneously perform the grouping of itself (the communication device 2) and the associating with uplink frame UL containing available physical random access channel, by solving the single equation "IMSI mod n=SFN mod n" based on the system frame number (SFN) and the group number (n) included in MSI such as MIB and SIB1 received from base stations 111, 121, 131 by the system information acquisition unit 31 through downlink frames DL and the communication device identification information (IMSI) of the communication device 2 itself. Thus, the communication device grouping unit 32 and the random access information transmission restriction unit 33, shown as separate functional blocks in FIG. 2, can be realized as a single functional block that solves the single equation "IMSI mod n=SFN mod n".

The equation "IMSI mod n=SFN mod n" is an operation that maps n random access groups of the communication devices 2 that are composed according to the value of "IMSI mod n" (0, 1, . . . , n−1) on the left-hand side, and n frame groups into which M (e.g. 1024) uplink frames UL with different system frame numbers are grouped according to the value of "SFN mod n" (0, 1, . . . , n−1) on the right-hand side, on a one-to-one basis. In other words, the communication device grouping unit 32 groups each communication device 2 into n random access groups corresponding to n frame groups. Then, the random access information transmission restriction unit 33 restricts the transmission of random access preamble, for a communication device 2 grouped into each of the n random access groups, over the physical random access channels not included in the uplink frame UL belonging to the frame group associated with each random access group.

In the above example, n random access groups of the communication devices 2 and n frame groups of uplink frames UL are mapped to each other based on the equation "IMSI mod n=SFN mod n". However, in case the identification information of N physical random access channels such as "PRACH #1" and "PRACH #2" illustrated in FIG. 2 (hereinafter also referred to as random access channel identification information, PRACH identification information and the like) is provided, and can be acquired by the system information acquisition unit 31 through MSI such as MIB and SIB1, n random access groups of the communication devices 2 and n random access channel groups of physical random access channels may be mapped to each other based on the equation "IMSI mod n=PRACH mod n" (where "PRACH" represents the PRACH identification information). In such a case, the random access groups are mapped directly to the random access channel groups, rather than indirectly to the random access channel groups via frame groups as in the above example.

Figure 5:
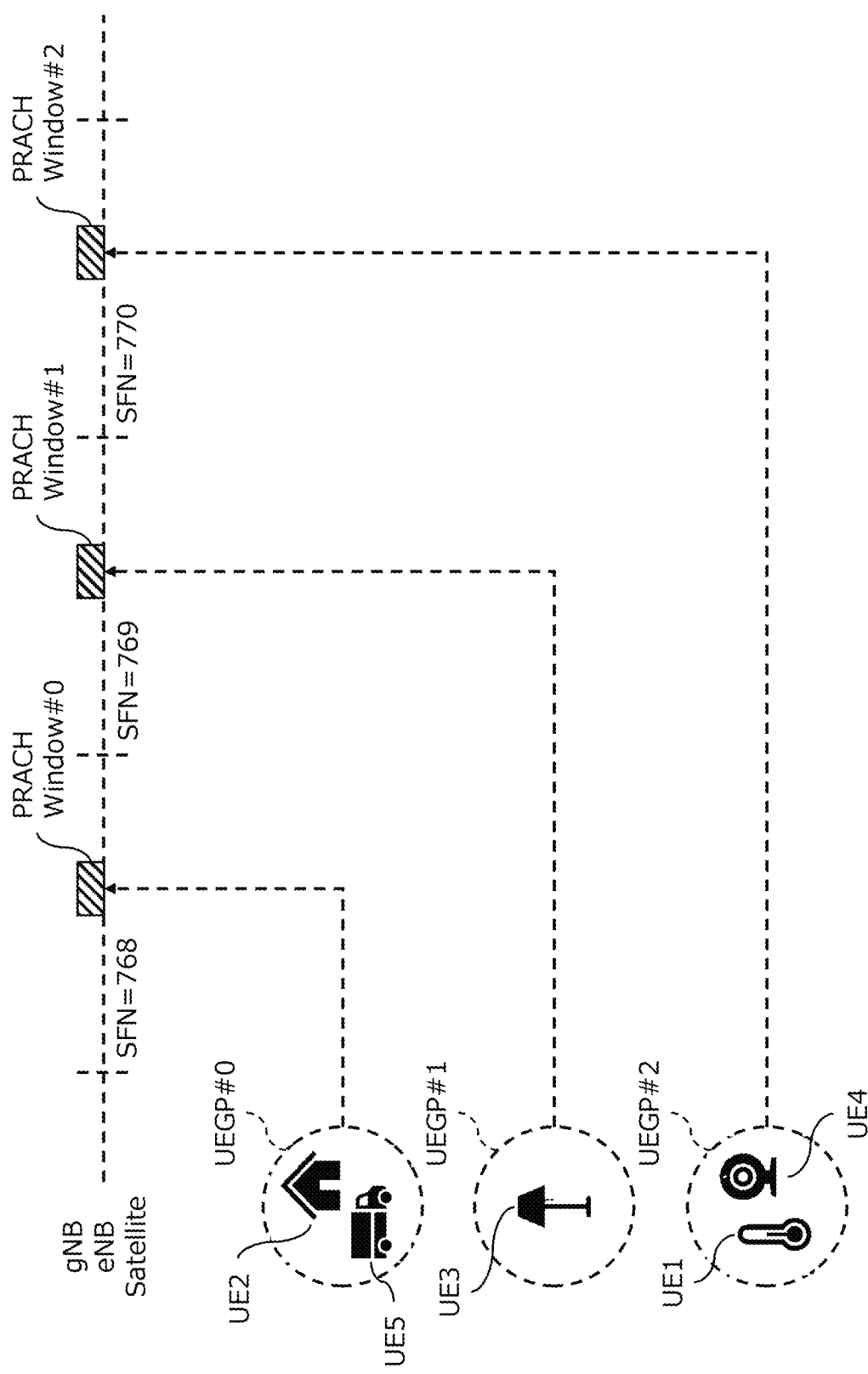
FIG. 5 shows a concrete example.

FIGS. 3 to 5 show specific examples. As shown in FIG. 3, the example allocates or maps five communication devices "UE1" to "UE5" with five consecutive IMSIs "1013016041741" to "1013016041745" to physical random access channels in three uplink frames with system frame numbers "768" to "770". The group number n in the example is "3" as also shown in FIG. 4. FIG. 4 illustrates the process of solving the aforementioned equation "IMSI mod n=SFN mod n". Based on the communication device identification information (IMSI) of each communication device 2, system frame number (SFN), and group number (n), "IMSI mod n" and "SFN mod n" are calculated, and determined whether they match (TRUE) or not (FALSE). Only the combination of the communication device identification information (IMSI) and system frame number (SFN) that results in "TRUE" is allowed for the random access of the communication device 2.

As shown schematically in FIG. 5, the communication devices "UE2" and "UE5" grouped into the 0th random access group "UEGP #0" with "IMSI mod n" being "0", are mapped to the uplink frame of the system frame number "768" with "SFN mod n" being "0". And, the communication devices "UE2" and "UE5" can send the random access preamble to the 0th physical random access channel "PRACH Window #0" included in the uplink frame (they cannot send the random access preamble to other physical random access channels "PRACH Window #1" and "PRACH Window #2"). Similarly, the communication device "UE3" grouped into the first random access group "UEGP #1" with "IMSI mod n" being "1" is mapped to the uplink frame of the system frame number "769" with "SFN mod n" being "1". And, the communication device "UE3" can send the random access preamble to the first physical random access channel "PRACH Window #1" included in the uplink frame (it cannot send the random access preamble to other physical random access channels "PRACH Window #0" and "PRACH Window #2"). Also, the communication devices "UE1" and "UE4" grouped into the second random access group "UEGP #2" with "IMSI mod n" being "2", are mapped to the uplink frame of the system frame number "770" with "SFN mod n" being "2". And, the communication devices "UE1" and "UE4" can send the random access preamble to the second physical random access channel "PRACH Window #2" included in the uplink frame (they cannot send the random access preamble to other physical random access channels "PRACH Window #0" and "PRACH Window #1").

Figure 6:
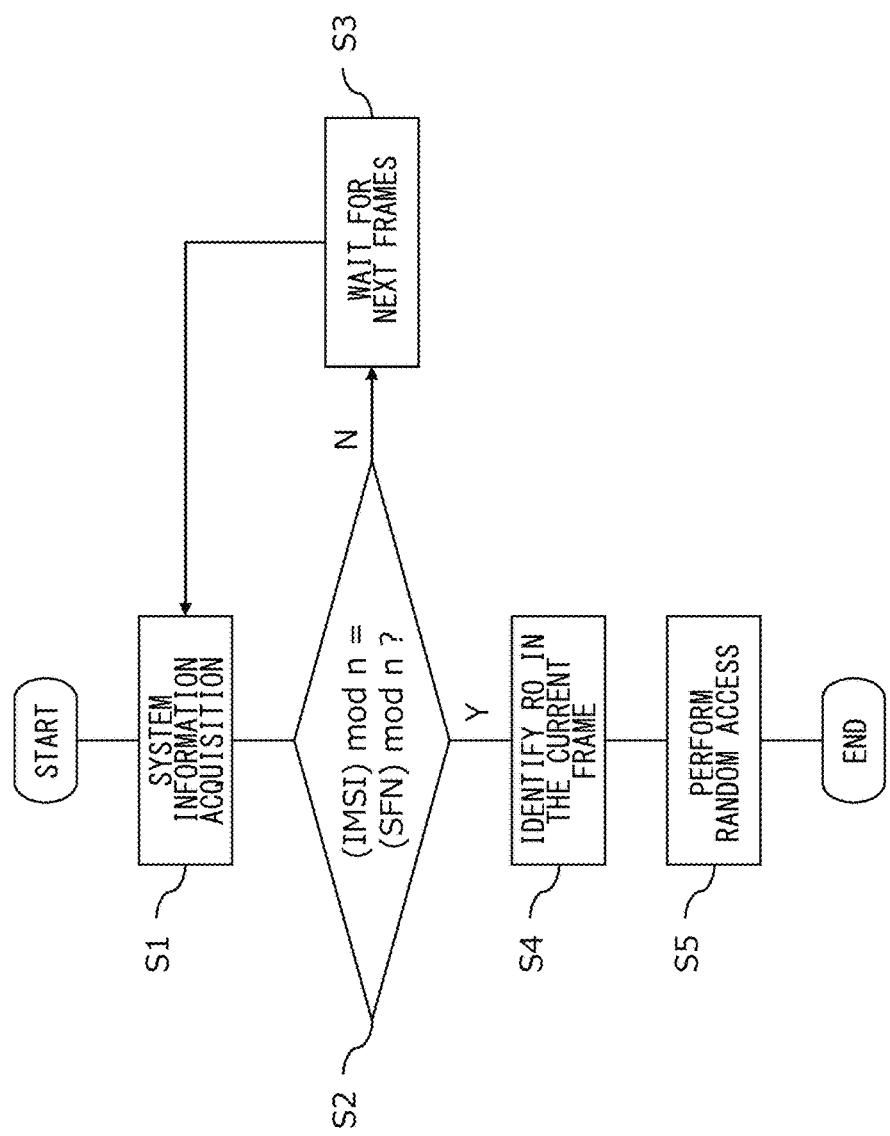
FIG. 6 is a flowchart of the random access control by the communication control apparatus.

FIG. 6 is a flowchart of random access control by the communication control apparatus 3. "S" in the flowchart description means a step or a process. In S1, the system information acquisition unit 31 acquires the system information from downlink frames DL transmitted from the base stations 111, 121, 131. In S2, the communication device grouping unit 32 and the random access information transmission restriction unit 33 associate the communication device 2 with uplink frame, by solving the equation "IMSI mod n=SFN mod n" based on the system frame number (SFN) and the group number (n) included in the system information such as MIB and SIB1 acquired in S1 and the communication device identification information (IMSI) of the communication device 2. The communication device 2 that does not satisfy "IMSI mod n=SFN mod n" for the current uplink frame (No in S2) proceed to S3, and wait for an uplink frame with a system frame number that satisfies "IMSI mod n=SFN mod n", and return to S1. The communication device 2 that satisfies "IMSI mod n=SFN mod n" for the current uplink frame (Yes in S2) proceed to S4, and the random access channel identification unit 311 identifies the random access channel (RO: RACH Occasion) in the uplink frame. In S5, the communication device 2 transmits the random access preamble to the base stations 111, 121, 131 over the random access channel identified in S4.

Figure 7:
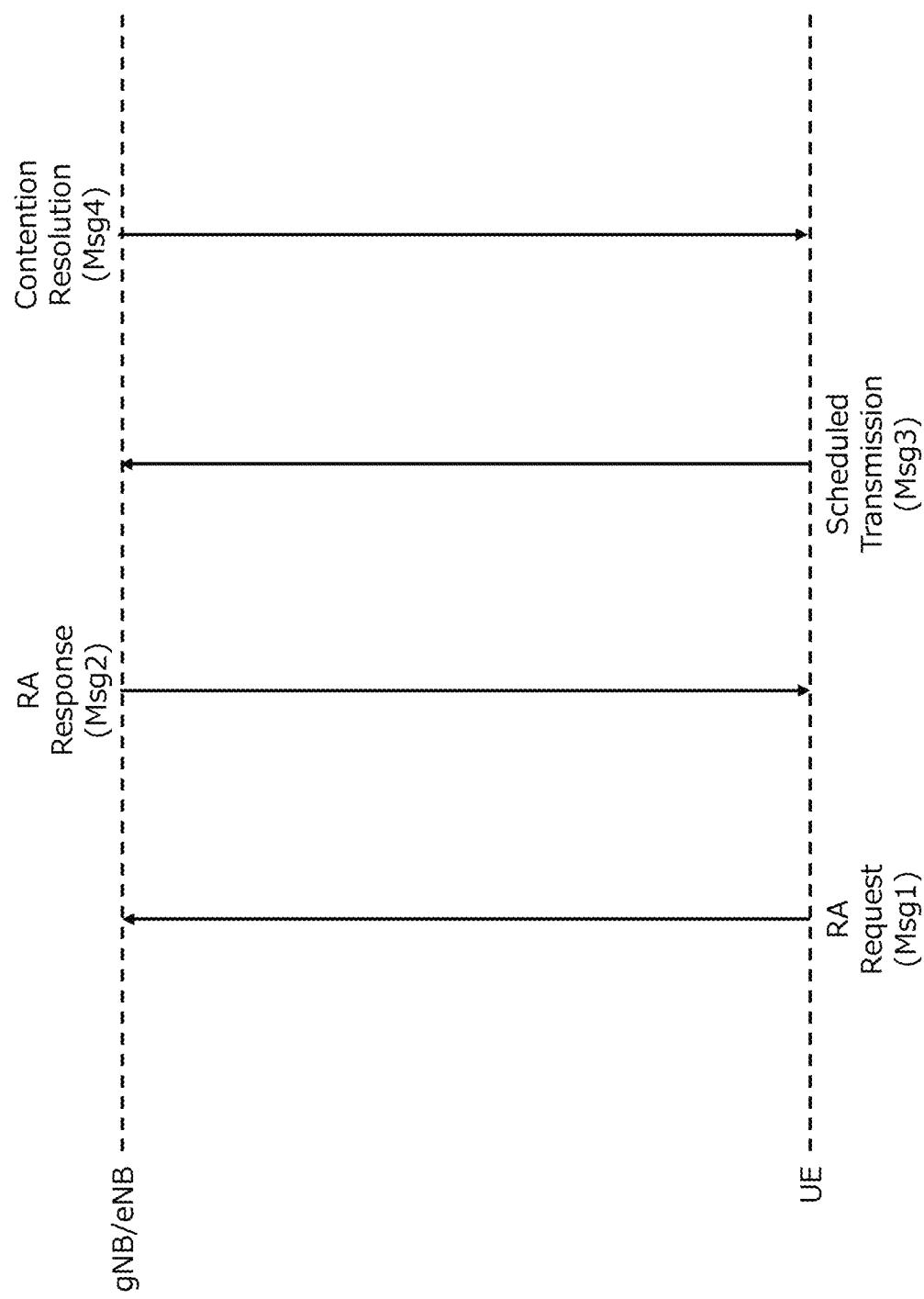
FIG. 7 schematically shows the CBRA procedure between a communication device and a terrestrial base station.

FIG. 7 schematically shows the contention based random access (CBRA) procedure between the communication device 2 and the terrestrial base stations 111, 121. The CBRA procedure is composed of four messages exchanged between the communication device 2 (UE) and the terrestrial base stations 111, 121 (gNB/eNB). The first message (Msg1) is random access request (RA Request) sent from the communication device 2 to the terrestrial base stations 111, 121. The communication device 2 attempting random access to the terrestrial base stations 111, 121 to establish connection, selects any one preamble from up to 64 predefined mutually orthogonal random access preambles (hereinafter briefly referred to as preambles) that the terrestrial base stations 111, 121 can accept, and sends it in the first message to the terrestrial base stations 111, 121 over the physical random access channel.

The second message (Msg2) is random access response (RA Response) sent from the terrestrial base stations 111, 121 to the communication device 2. The terrestrial base stations 111, 121 that have received the preamble from the communication device 2 through the physical random access channel, send the random access response (hereinafter briefly referred to as response) to the communication device 2 and proceed to the subsequent connection establishment steps by the third message and the fourth message, if no other communication devices 2 have sent the same preamble to the terrestrial base stations 111, 121 over the same physical random access channel (if there is no preamble collision).

On the other hand, when multiple communication devices 2 send the same preamble to the terrestrial base stations 111, 121 over the same physical random access channel, the terrestrial base stations 111, 121 take actions such as: sending the response to only one communication device 2; sending the response to only one communication device 2 to allow proceeding to connection establishment steps, and sending the response to the other communication devices 2 to specify waiting time for next random accesses; and not sending the response to any communication devices 2. The communication devices 2 that could not receive the normal response from the terrestrial base stations 111, 121 have to wait until next other physical random access channels. In the example in FIG. 2, the time interval between adjacent physical random access channels is approximately the frame length of the uplink frame UL (10 ms), which would be the delay time for each communication device 2 caused by at least one PRACH wait.

In 5G, which advocates Massive Machine-Type Communications (mMTC), the number of communication devices 2, including IoT devices, connected to a single terrestrial base station 111, 121 at the same time is increasing, resulting in potential "congestion" (hereinafter referred to as PRACH congestion) by communication devices 2 waiting for PRACH described above. A single physical random access channel can only accept a maximum of 64 mutually different (orthogonal) preambles, and each communication device 2 randomly selects one preamble and cannot recognize in advance preambles transmitted by other communication devices 2. Therefore, as the number of communication devices 2 simultaneously attempting random access increases, preamble collisions, in which multiple communication devices 2 select the same preamble, occur frequently, causing serious PRACH congestion.

According to the present embodiment described with respect to FIG. 2, for a communication device 2 grouped into each random access group "UEGP #1" and "UEGP #2", the transmission of preamble to a base station 111, 121, 131 over the physical random access channels except for the physical random access channel "PRACH #1" and "PRACH #2" corresponding to each random access group "UEGP #1" and "UEGP #2" is restricted. In other words, since the number of communication devices 2 that can transmit preamble (the first message) over each physical random access channel "PRACH #1" and "PRACH #2" is effectively limited (or a large number of the communication devices 2 are effectively distributed among multiple physical random access channels "PRACH #1" and "PRACH #2"), the likelihood of contention or collision of preambles of multiple communication devices 2 on the same physical random access channel "PRACH #1" and "PRACH #2" is reduced. Therefore, the random access procedure of each communication device 2 can be made more efficient.

The communication device 2 that has received a normal response (the second message) from the terrestrial base stations 111, 121 transmits the third message (Msg3) to the terrestrial base stations 111, 121, following the timing information and/or scheduling permission (specifying the resource or physical uplink shared channel (PUSCH) in the uplink frame UL that can be used to transmit the third message). The third message includes the communication device identification information and the like of the communication device 2. Upon receipt of the third message, the terrestrial base stations 111, 121 identify or authenticate the communication device 2 based on the communication device identification information and the like in coordination with the core network CN, and send the notification of completion as the fourth message (Msg4) to the communication device 2. After the above series of four messages are successfully exchanged, the connection is established between the communication device 2 and the terrestrial base stations 111, 121.

Figure 8:
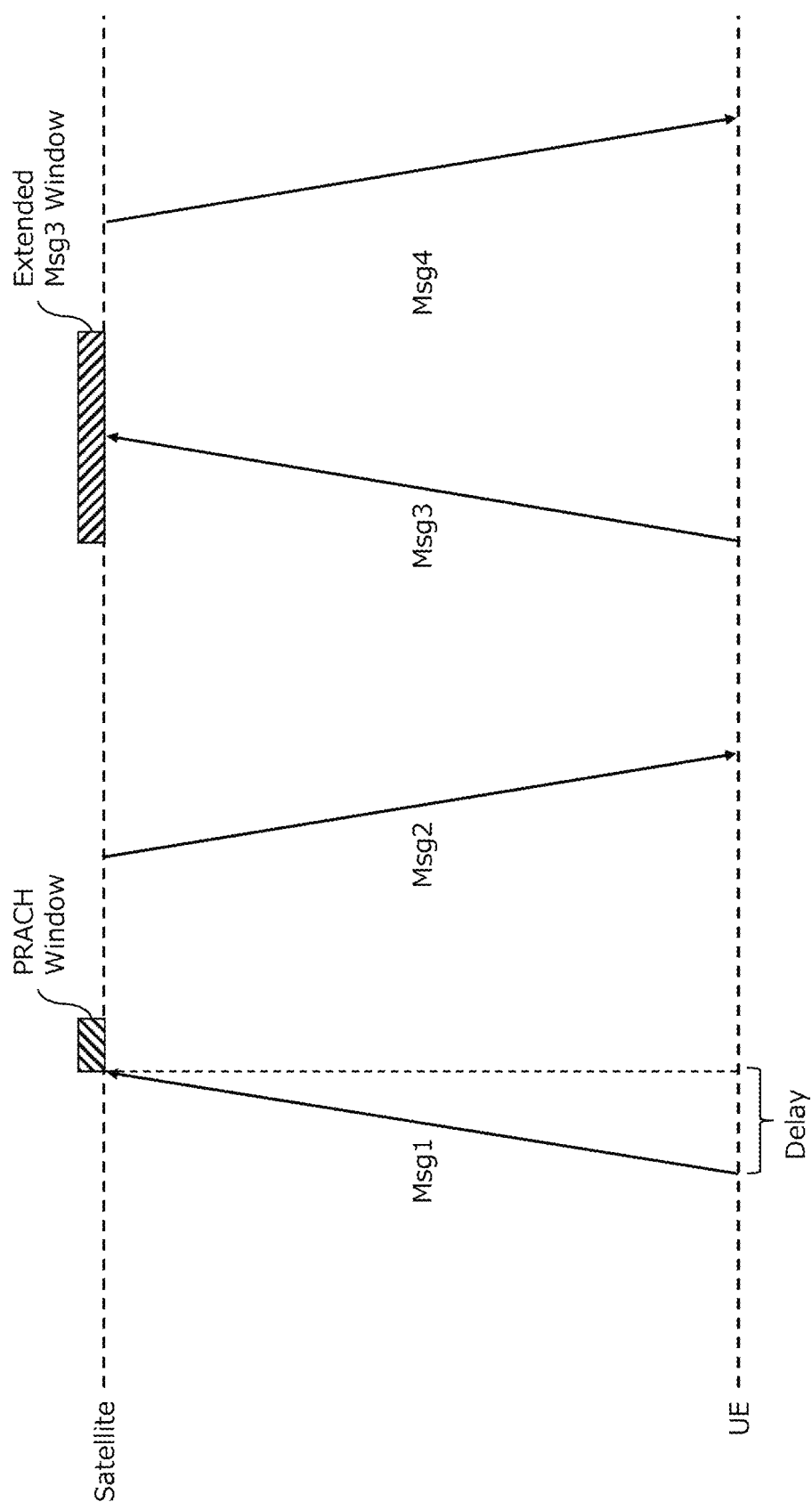
FIG. 8 schematically shows the CBRA procedure between a communication device and a non-terrestrial base station.

FIG. 8 schematically illustrates the CBRA procedure between the communication device 2 and the communication satellite 131 as a non-terrestrial base station. Similar to FIG. 7 for terrestrial base stations 111, 121, the CBRA procedure consists of four messages exchanged between the communication device 2 (UE) and the communication satellite 131 (Satellite). Due to the large distance between the communication device 2 and the communication satellite 131, the communication of each message is accompanied by a non-negligible (typically greater than 20 ms) propagation delay (Delay). Then, the communication device 2 that transmits the first and third messages to the communication satellite 131, calculates the distance or propagation delay between the itself and the communication satellite 131, based on its own positioning information by GNSS (Global Navigation Satellite System) and the like and the ephemeris information of the communication satellite 131. And, the communication device 2 transmits each message at earlier timing considering the propagation delay, so that each message reaches at the right timing to: the physical random access channel window (the time frame of the length of each physical random access channel (1 ms) in FIG. 2) for receiving the first message (random access request including preamble) prepared on the communication satellite 131 side; and/or the message window for the receiving the third message.

In addition, on the communication satellite 131 side, in order to ensure the receipt of the third message from the communication device 2, the length of the message window for receiving the third message (the length of the PUSCH arranged for receiving the third message) is made longer than the terrestrial base stations 111, 121. Thus, the CBRA procedure for the communication satellite 131 takes a longer time due to propagation delays and consumes more resources for reliable message communication than those in the CBRA procedure for the terrestrial base stations 111, 121. As such, in the NTN comprised by the communication satellite 131, the PRACH congestion is more likely to occur and become more severe than in the TN in FIG. 7. For the reason, as described in the present embodiment with respect to FIG. 2, it is critically important to effectively limit the number of communication devices 2 that can transmit preamble (the first message) over each physical random access channel "PRACH #1" and "PRACH #2", and reduce the likelihood of contention or collision of preambles of multiple communication devices 2 on the same physical random access channel "PRACH #1" and "PRACH #2".

PRACH congestion in NTN can, for example, be caused when a large number of NB-IoT devices (communication devices 2), that intermittently receive signals according to a DRX (Discontinuous Reception) cycle, are transitioned or activated from a standby state to a signal reception state all at once. In other words, a large number of NB-IoT devices that are activated simultaneously may transmit duplicate preambles to the same physical random access channel simultaneously. PRACH congestion in NTN can also be caused by the discontinuity of non-terrestrial communication cells provided on the ground by non-terrestrial base stations such as communication satellites 131. For example, in case a second communication satellite flies following a first communication satellite, and there is a gap between a first satellite communication cell by the first communication satellite and a second satellite communication cell by the second communication satellite, a large number of communication devices disconnected from the first satellite communication cell as the first communication satellite flies away, may simultaneously attempt random access to the second communication satellite flying in later.

Although FIGS. 7 and 8 show a four-step CBRA procedure consisting of four messages, the present embodiment can also be applied to a two-step CBRA procedure consisting of two messages. In the two-step CBRA procedure, the information equivalent to the third message in the four-step CBRA procedure is included in the first message, and the information equivalent to the fourth message in the four-step CBRA procedure is included in the second message. In NTN where the communication of each message involves a large propagation delay, the propagation delay can be minimized by the two-step CBRA procedure with the minimum number of messages. On the other hand, the two-step CBRA procedure may waste resources used to transmit the information equivalent to the third message in the event of a preamble collision from multiple communication devices 2. However, the embodiment can reduce the possibility of preamble collisions, thus minimizing propagation delay while using resources efficiently.

FIGS. 9 and 10 show the estimation results of PRACH congestion in NTN where the present embodiment described in relation to FIG. 2 and the like is not applied. Specifically, the estimation results of the communication range of each communication satellite 131 (Coverage), the number of random access attempts per second by each communication device 2 (RACH per second per UE), the density of the communication devices 2 that can be supported by each communication satellite 131 (Supported UE density) are shown, for a communication satellite 131 flying in a geo-synchronous equatorial orbit (GEO) at a height of approximately 36,000 km above the ground and a communication satellite 131 flying in a low earth orbit (LEO) at a height of less than 2,000 km above the ground. The estimation was conducted using one typical set of parameters, specifically, collision rate "0.01", number of preambles "56", preamble format "0", PRACH configuration index "27", number of frequency multiplexing "8" and the like.

As shown in FIG. 9, the larger the communication range as for the GEO satellites, and the higher the frequency of random accesses by each communication device 2, the lower the density of communication devices 2 that can be supported by each communication satellite 131. Supported communication device density below "500 UE/km 2", which is considered undesirable for practical purposes, are highlighted by bold characters and bold frames. FIG. 10 shows the estimation results with further condition specified in "3GPP TR 38.821 Section 7.2.1.1.1.2" (the time interval between adjacent ROs (RACH Occasions) is greater than twice the maximum delay in a satellite communication cell) in addition to FIG. 9. Compared to FIG. 9, the supported communication device density drops extremely especially for GEO satellite with a large communication range (there is even a case of "0 UE/km$^2$" meaning that practically no communication device 2 can be supported).

As described above, in the NTN comprised by the communication satellite 131, the PRACH congestion is likely to occur and become severe. For the reason, as described in the present embodiment with respect to FIG. 2, it is critically important to effectively limit the number of communication devices 2 that can transmit preamble (the first message) over each physical random access channel "PRACH #1" and "PRACH #2" (equivalent to lowering the "RACH per second per UE" in FIGS. 9 and 10), and reduce the likelihood of contention or collision of preambles of multiple communication devices 2 on the same physical random access channel "PRACH #1" and "PRACH #2".

The present disclosure has been described above based on embodiments. It is understood by those skilled in the art that the embodiments are exemplary and that various variations are possible in the combination of each component and/or each process thereof, and that such variations are also within the scope of the present disclosure.

The functional configuration of each device described in the embodiment can be realized by hardware resources or software resources, or by the cooperation of hardware resources and software resources. As hardware resources, processors, ROM, RAM, and other LSIs can be used. Operating systems, applications, and other programs can be used as software resources.

The present disclosure may be expressed as the following items.

1. A communication control apparatus comprising:
   a random access channel identification unit that identifies
   a plurality of random access channels over which a communication device can transmit random access information to a base station, a communication device grouping unit that groups each communication device into a plurality of random access groups that are associated with different portions of the plurality of random access channels, and a random access information transmission restriction unit that restricts the transmission of random access information, for a communication device grouped into each random access group, over the random access channels not associated with each random access group.

2. The communication control apparatus according to item 1, wherein a plurality of frames in which a communication device can transmit information to a base station are grouped into n (n is a natural number greater than or equal to 2) frame groups, the communication device grouping unit groups each communication device into n random access groups corresponding to the n frame groups, and the random access information transmission restriction unit restricts the transmission of random access information, for a communication device grouped into each random access group, over the random access channels not included in the frame belonging to the frame group associated with each random access group.

3. The communication control apparatus according to item 2, wherein the communication device grouping unit groups each communication device into n random access groups according to the remainder of communication device identification information of each communication device divided by n, and the random access information transmission restriction unit restricts the transmission of random access information, for a communication device grouped into each random access group, over the random access channels included in the frame in which the remainder of the frame number divided by n is not equal to the remainder of the communication device identification information divided by n.

4. The communication control apparatus according to item 3, wherein the communication device identification information is user identification number assigned to a user of a communication device.

5. The communication control apparatus according to item 3 or 4, wherein the communication device grouping unit is provided in each communication device and groups itself into a random access group according to the remainder of the communication device identification information divided by n, and the random access information transmission restriction unit is provided in each communication device and restricts the transmission of random access information over the random access channels included in the frame in which the remainder of the frame number divided by n, calculated based on frame number and group number n received from a base station, is not equal to the remainder of the communication device identification information divided by n.

6. The communication control apparatus according to any of items 1 to 5, wherein the random access channel identification unit, the communication device grouping unit, and the random access information transmission restriction unit are provided in each communication device.

7. The communication control apparatus according any of items 1 to 6, wherein the base station is a flying non-terrestrial base station.

8. The communication control apparatus according to item 7, wherein the non-terrestrial base station is a communication satellite flying in outer space.

9. The communication control apparatus according to any of items 1 to 8, wherein the plurality of random access channels are grouped into n (n is a natural number greater than or equal to 2) random access channel groups, the communication device grouping unit groups each communication device into n random access groups corresponding to the n random access channel groups, and the random access information transmission restriction unit restricts the transmission of random access information, for a communication device grouped into each random access group, over the random access channels not belonging to the random access channel group associated with each random access group.

10. The communication control apparatus according to item 9, wherein the communication device grouping unit groups each communication device into n random access groups according to the remainder of communication device identification information of each communication device divided by n, and the random access information transmission restriction unit restricts the transmission of random access information, for a communication device grouped into each random access group, over the random access channels in which the remainder of random access channel identification information divided by n is not equal to the remainder of the communication device identification information divided by n.

11. A communication control method comprising:

identifying a plurality of random access channels over which a communication device can transmit random access information to a base station, grouping each communication device into a plurality of random access groups that are associated with different portions of the plurality of random access channels, and restricting the transmission of random access information, for a communication device grouped into each random access group, over the random access channels not associated with each random access group.

12. A computer-readable medium storing a communication control program causing a computer to perform:

identifying a plurality of random access channels over which a communication device can transmit random access information to a base station, grouping each communication device into a plurality of random access groups that are associated with different portions of the plurality of random access channels, and restricting the transmission of random access information, for a communication device grouped into each random access group, over the random access channels not associated with each random access group.

The application claims priority of Japanese patent application 2021-177197, filed on Oct. 29, 2021, which is hereby incorporated by reference in its entirety.

The present disclosure relates to random access control in communication system.

1 wireless communication system, 2 communication device, 3 communication control apparatus, 11 5G wireless communication system, 12 4G wireless communication system, 13 satellite communication system, 31 system information acquisition unit, 32 communication device grouping unit, 33 random access information transmission restriction unit, 111 5G base station, 112 5G cell, 121 4G base station, 122 4G cell, 131 communication satellite, 132 satellite communication cell, 133 gateway, 311 random access channel identification unit.

What is claimed is:

1. A communication control apparatus comprising:
a random access channel identification unit that identifies a plurality of random access channels over which a communication device can transmit random access information to a base station,
a communication device grouping unit that groups each communication device into a plurality of random access groups that are associated with different portions of the plurality of random access channels, and
a random access information transmission restriction unit that restricts the transmission of random access information, for a communication device grouped into each random access group, over the random access channels not associated with each random access group, wherein:
the communication device grouping unit groups each communication device into n (n is a natural number greater than or equal to 2) random access groups according to the remainder of communication device identification information of each communication device divided by n, and
the random access information transmission restriction unit restricts the transmission of random access information, for a communication device grouped into each random access group, over the random access channels in which the remainder of random access channel identification information divided by n is not equal to the remainder of the communication device identification information divided by n.

2. The communication control apparatus according to claim 1, wherein the communication device identification information is user identification number assigned to a user of a communication device.

3. The communication control apparatus according to claim 1, wherein
the communication device grouping unit is provided in each communication device and groups itself into a random access group according to the remainder of the communication device identification information divided by n, and
the random access information transmission restriction unit is provided in each communication device.

4. The communication control apparatus according to claim 1, wherein the random access channel identification unit, the communication device grouping unit, and the random access information transmission restriction unit are provided in each communication device.

5. The communication control apparatus according to claim 1, wherein the base station is a flying non-terrestrial base station.

6. The communication control apparatus according to claim 5, wherein the non-terrestrial base station is a communication satellite flying in outer space.

7. A communication control method comprising:
identifying a plurality of random access channels over which a communication device can transmit random access information to a base station,
grouping each communication device into a plurality of random access groups that are associated with different portions of the plurality of random access channels, and
restricting the transmission of random access information, for a communication device grouped into each random access group, over the random access channels not associated with each random access group, wherein:
the grouping includes:
grouping each communication device into n (n is a natural number greater than or equal to 2) random access groups according to the remainder of communication device identification information of each communication device divided by n, and
the restricting includes:
restricting the transmission of random access information, for a communication device grouped into each random access group, over the random access channels in which the remainder of random access channel identification information divided by n is not equal to the remainder of the communication device identification information divided by n.

8. A non-transitory computer-readable medium storing a communication control program causing a computer to perform:
identifying a plurality of random access channels over which a communication device can transmit random access information to a base station,
grouping each communication device into a plurality of random access groups that are associated with different portions of the plurality of random access channels, and
restricting the transmission of random access information, for a communication device grouped into each random access group, over the random access channels not associated with each random access group, wherein:
the grouping includes:
grouping each communication device into n (n is a natural number greater than or equal to 2) random access groups according to the remainder of communication device identification information of each communication device divided by n, and
the restricting includes:
restricting the transmission of random access information, for a communication device grouped into each random access group, over the random access channels in which the remainder of random access channel identification information divided by n is not equal to the remainder of the communication device identification information divided by n.

* * * * *